(12) United States Patent
Devita et al.

(10) Patent No.: US 7,261,669 B2
(45) Date of Patent: Aug. 28, 2007

(54) VEHICLE AND METHOD FOR CONTROLLING AN ENGINE IN A VEHICLE

(75) Inventors: Bart Devita, Romulus, MI (US); Pawel Rygulski, Centerline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 10/907,299

(22) Filed: Mar. 28, 2005

(65) Prior Publication Data
US 2006/0217228 A1 Sep. 28, 2006

(51) Int. Cl.
B60K 1/02 (2006.01)
B60L 9/00 (2006.01)
G06F 7/00 (2006.01)
G06F 17/00 (2006.01)
F02N 1/00 (2006.01)

(52) U.S. Cl. .................. 477/3; 477/7; 701/22; 701/29; 701/114; 123/179.24

(58) Field of Classification Search .................... 477/3, 477/7; 701/22, 29, 31, 102, 112–114; 123/179.2, 123/179.24
See application file for complete search history.

(56) References Cited

U.S. PATENT DOCUMENTS 5,697,466 A 12/1997 Moroto et al.
6,009,371 A 12/1999 Kobayashi
6,131,538 A 10/2000 Kanai
6,380,641 B2 4/2002 Matsubara et al.
6,457,351 B1 10/2002 Yamamoto
6,516,253 B2 2/2003 Boggs et al.
6,809,501 B2 10/2004 Kapsokavathis et al.
2003/0158638 A1 8/2003 Yakes et al.
2006/0244626 A1* 11/2006 Beyene .................. 340/825.37

OTHER PUBLICATIONS

Toyota PRIUS Repair Manual, Publication No. RM778U1, Toyota Motor Corp. (2000), vol. 1, pp. IN-14, IN-15.
Toyota PRIUS Repair Manual, Publication No. RM 778U2, Toyota Motor Corp. (2000), vol. 2, p. EM-3.

* cited by examiner

Primary Examiner—Tisha Lewis
(74) Attorney, Agent, or Firm—David B. Kelley; Brooks Kushman P.C.

(57) ABSTRACT

A vehicle is provided that includes an engine and an electric machine operable to provide torque to drive the vehicle. A control system, including at least one controller, is configured to selectively and automatically start and stop the engine when the vehicle is in a first operating mode. The control system further includes control logic executable to place the vehicle in a second operating mode wherein the engine can be cranked but not started. The execution of the control logic to place the vehicle in the second operating mode is effected by operation of at least one vehicle system.

19 Claims, 4 Drawing Sheets

VEHICLE AND METHOD FOR CONTROLLING AN ENGINE IN A VEHICLE

BACKGROUND OF THE INVENTION

1. Field of the Invention

The present invention relates to a vehicle and a method for controlling an engine in a vehicle, and more particularly, to a vehicle having an engine and an electric machine operable to provide torque to drive the vehicle.

2. Background Art

In an effort to increase fuel economy, decrease fuel consumption, and decrease exhaust emissions from vehicles, a number of alternative vehicle types are becoming increasingly popular. For example, a hybrid electric vehicle (HEV) that utilizes an internal combustion engine and one or more electric motors to provide torque to power the vehicle, provides an alternative to conventional vehicle types which rely exclusively on an engine to drive the vehicle. In some HEV's, the engine may be automatically stopped whenever it is not needed for such tasks as powering the vehicle, charging a battery, or providing power to operate one or more vehicle systems. Control of the engine in such a vehicle, including the selective starting and stopping of the engine, may be automatically handled by a control system. Therefore, anytime the vehicle is being operated, the engine may or may not be running, depending on the particular requirements of the vehicle.

The selective and automatic starting and stopping of an engine in an HEV, although useful to reduce fuel consumption and exhaust emissions, may present particular challenges to a service technician who needs the engine to run continuously for some period of time while a diagnostic or repair procedure is taking place. One attempt to deal with this situation is discussed in U.S. Pat. No. 6,131,538 issued to Kanai on Oct. 17, 2000. Kanai discusses an apparatus for controlling the engine in an HEV, including operation of the engine in an inspection mode. In order to facilitate the inspection mode, a check wire is applied to a diagnosis connector to connect a pair of predetermined electric terminals to each other. The connection of these terminals provides an output signal that facilitates putting the engine in an inspection mode—a mode which may be characterized by continuous operation of the engine.

One limitation of the apparatus described in Kanai, is the need to use an external device, such as the check wire, to facilitate placing the engine in the inspection mode. It would be more convenient, and therefore desirable, if an HEV were equipped to operate an engine in an inspection mode by using only existing vehicle systems, thereby eliminating the need for any external devices. In addition, it may desirable to provide other inspection modes, wherein the engine is operated under some other predetermined set of conditions that were different from the normal operating conditions. For example, in order to check the compression of the cylinders in the engine, it is necessary to crank the engine—i.e., move the pistons up and down within their respective cylinders—while prohibiting starting of the engine.

Such an inspection mode is described for a hybrid electric vehicle in Toyota Prius Repair Manual, Vol. 2, Pub. No. RM778U2, Copyright 2000 Toyota Motor Corporation. The compression inspection routine provides a cranking mode during which cylinder compression can be measured. To facilitate the compression inspection, a hand-held tester is connected to an input port and a cranking mode is chosen on the hand-held tester. This method also requires the use of a device external to the vehicle to facilitate the testing. It would be desirable to facilitate this type of inspection mode in an HEV without the need to use external devices which may add cost and complexity to the procedure.

SUMMARY OF THE INVENTION

Accordingly, one advantage of the present invention is that it provides a hybrid electric vehicle that can be placed in a diagnostic mode wherein the engine can be cranked, but not started, and this diagnostic mode can be entered without the use of any devices external to the vehicle.

Another advantage of the invention is that it provides a vehicle that can be placed in an inspection mode wherein the engine may be operated continuously.

Another advantage of the invention is that it provides a timed sequence of operations of vehicle systems to place the vehicle in an inspection mode, the timed sequence helping to ensure that the vehicle is not unintentionally placed in the inspection mode.

The invention also provides a vehicle including an engine and an electric machine operable to provide torque to drive the vehicle. A control system includes at least one controller, and is configured to selectively and automatically start and stop the engine when the vehicle in a first operating mode. The control system further includes control logic that is executable to place the vehicle in a second operating mode wherein the engine can be cranked but not started. The execution of the control logic to place the vehicle in the second operating mode is effected by operation of at least one vehicle system.

The invention further provides a vehicle including an engine and an electric machine operable to provide torque to drive the vehicle. A control system, including at least one controller, is configured to effect at least two vehicle operating modes. The vehicle operating modes include a normal operating mode and a first diagnostic operating mode. The normal operating mode includes selective and automatic starting and stopping of the engine based at least in part on vehicle power requirements. The first diagnostic operating mode is effective to facilitate cranking of the engine and prohibit starting of the engine. At least one vehicle system is operable in a predetermined manner to change the vehicle operating mode from the normal operating mode to the first diagnostic operating mode.

The invention also provides a method for controlling an engine in a vehicle having an electric machine operable to provide torque to drive the vehicle. The vehicle includes a first operating mode wherein the engine is selectively and automatically started and stopped based at least in part on vehicle power requirements. The method includes operating at least one vehicle system in a first predetermined manner to change the vehicle operating mode from the first operating mode to a second operating mode. The change in the vehicle operating mode thus occurs without employing the use of a device external to the vehicle. The second operating mode facilitates cranking of the engine and prohibiting starting of the engine.

DETAILED DESCRIPTION OF THE PREFERRED EMBODIMENT(S)

Figure 1:
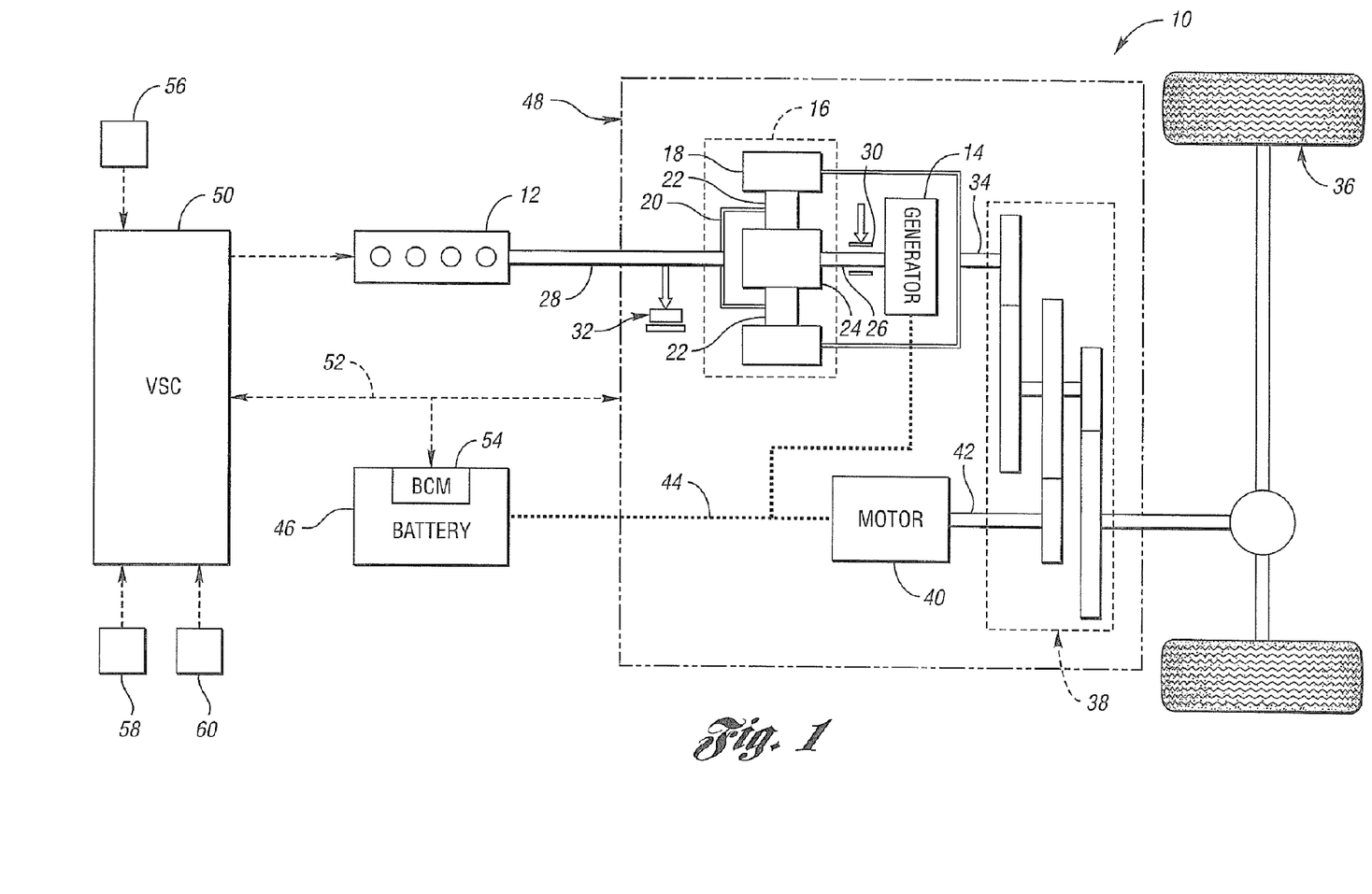
FIG. 1 is a schematic representation of a vehicle in accordance with the present invention.

FIG. 1 shows a schematic representation of a vehicle 10 in accordance with the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. To control the engine 12 and the components of the transaxle 48—i.e., the generator 14 and motor 40—a control system, including a controller 50, is provided. As shown in FIG. 1, the controller 50 is a vehicle system controller (VSC), and although it is shown as a single controller, it may include multiple controllers. For example, the VSC 50 may include a separate powertrain control module (PCM), which could be software embedded within the VSC 50, or it could be a separate hardware device.

A controller area network (CAN) 52 allows the VSC 50 to communicate with the transaxle 48 and a battery control mode (BCM) 54. Just as the battery 46 has the BCM 54, other devices controlled by the VSC 50 may have their own controllers. For example, an engine control unit (ECU) may communicate with the VSC 50 and may perform control functions on the engine 12. In addition, the transaxle 48 may include one or more controllers, such as a transaxle control module (TCM), configured to control specific components within the transaxle 48, such as the generator 14 and/or the motor 40. Some or all of these controllers may be a part of a control system for the present invention.

In addition to inputs from the transaxle 48, the VSC 50 also includes inputs from other vehicle systems. For example, an accelerator pedal 56 communicates an accelerator pedal position to the VSC 50. In addition, an ignition switch 58 communicates to the VSC 50 whether it is in a stop, run, or start position. Also shown in FIG. 1 is a transmission gear selector 60 which communicates to the VSC 50 which gear the driver has selected—e.g., park, neutral, forward or reverse.

The VSC 50 is programmed with control logic that is effective to place the vehicle 10 in one or more operating modes. For example, the vehicle 10 includes a first, or normal operating mode, during which the VSC 50 will selectively and automatically start and stop the engine 12 based at least in part on power requirements of the vehicle 10. In the normal operating mode, the VSC 50 evaluates inputs from a number of the vehicle systems to determine the vehicle power requirements—e.g., the amount of torque required to propel the vehicle 10 and the amount of electrical energy required from the battery 46 to power various vehicle systems. When the VSC 50 determines that the engine 12 is not required, the engine 12 will be shut off until vehicle operating conditions change. If the vehicle 10 were always operated in the normal operating mode, it could be difficult for a technician to service the vehicle 10, and particularly difficult to service the engine 12. Thus, the present invention contemplates at least one diagnostic mode, wherein operation of the engine is independent of the vehicle power requirements.

In one diagnostic mode, for example, it may be desirable to operate the engine such that it is allowed to crank, but not to start. In such a situation, the engine crankshaft would spin, and the pistons move up and down, but no combustion would occur. To facilitate operation in a cranking mode such as this, the present invention provides a second operating mode, or first diagnostic operating mode, during which cranking of the engine 12 is facilitated, but starting of the engine 12 is prohibited.

To facilitate changing the vehicle operating mode from the normal operating mode to the first diagnostic operating mode, it is desirable to rely on existing vehicle systems. That is, it may be inconvenient and costly to require the use of computers, scanning devices, and/or other diagnostic devices external to the vehicle 10 merely to change the operating mode. Therefore, the present invention provides a method for changing the vehicle operating mode without employing the use of a device external to the vehicle. In order to facilitate changing of the operating mode of the vehicle 10, any of a number of vehicle systems can be used. For example, the VSC 50 can be configured such that the accelerator pedal 56, the ignition switch 58, and the transmission gear selector 60 may be used individually, or together, in some predetermined sequence of steps, in order to change the vehicle operating mode.

Figure 2:
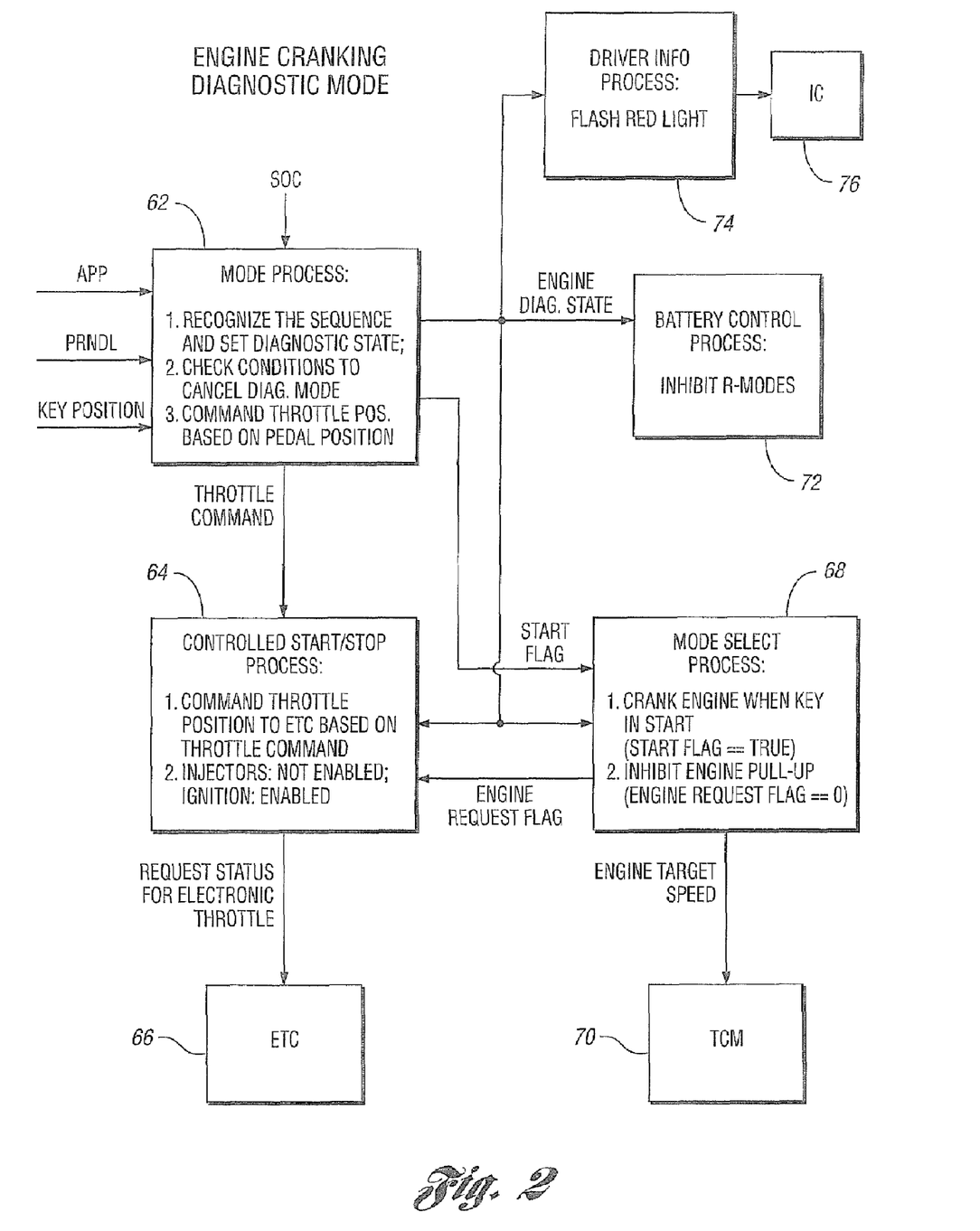
FIG. 2 is a logic diagram illustrating control logic for a diagnostic mode in accordance with the present invention.

FIG. 2 illustrates one example of control logic that can be programmed into a controller, such as the VSC 50, in order to facilitate a change in vehicle operating modes from a normal operating mode to an engine cranking diagnostic mode. As shown in block 62, the Mode Process evaluates a number of inputs. For example, a state of charge (SOC) of the battery 46 is input, as is an accelerator pedal position (APP), a transmission gear selector position (PRNDL), and a key position for the ignition switch 58. As noted above, and explained more fully below, the accelerator pedal 56, the ignition switch 58, and the transmission gear selector 60 can be operated in a predetermined sequence of steps to place the vehicle operating mode in the engine cranking diagnostic mode.

As shown in the Mode Process block 62, the sequence of vehicle system operations is recognized, and the diagnostic state is set. Under certain conditions, the Mode Process 62 will cancel the diagnostic mode, even when the appropriate sequence of steps is recognized. For example, if the battery SOC is below some predetermined value—e.g., 45%—the mode process logic will not allow the vehicle to be changed to the engine cranking diagnostic mode. This is because engine cranking will draw energy from the battery 46, and prohibiting entry into the engine cranking diagnostic mode helps to ensure that the battery SOC will not go too low.

The Mode Process 62 also commands the position of a throttle (not shown) based on the accelerator pedal position. If the accelerator pedal is fully depressed, the Mode Process 62 will command the throttle to be wide open. Conversely, if the accelerator pedal is completely released, the Mode Process 62 will command the throttle to be completely closed (this is sometimes called "closed in the bore"). If the accelerator pedal position is in any other position except fully open or fully closed, the Mode Process 62 will command the throttle to remain in its previous state—i.e., fully open or fully closed.

The throttle command is received by the Controlled Start/Stop Process, shown in block 64. The Controlled Start/Stop Process 64 commands the throttle position to the electronic throttle control (ETC) based on the throttle command received from the Mode Process 62. In addition, the Controlled Start/Stop Process 64 enables ignition, but disables fuel injectors. This is because it is desirable to allow the engine 12 to crank, by placing the ignition switch 58 in the start position, but at the same time, ensure that no combustion occurs. Thus, the fuel injectors are disabled in this mode. As shown in FIG. 2, the ETC 66 receives information regarding the throttle status from the Controlled Start/Stop Process 64.

In addition to communicating with the ETC 66, the Controlled Start/Stop Process 64 communicates with a Mode Select Process, shown in block 68. The Mode Select Process 68 is effective to crank the engine 12 when the ignition switch 58 is in the start position. Here, a start flag is set to "TRUE". In addition, the Mode Select Process 68 inhibits engine pull-up—i.e., the engine 12 is not allowed to start. Here, an engine request flag is set to zero, and this is communicated back to the Controlled Start/Stop Process 64. The Mode Select Process 68 also sends an engine target speed to a transaxle control module (TCM) 70. The TCM 70 can keep the engine 12 operating at some predetermined speed when the ignition switch 58 is in the start position. Thus, the engine cranking diagnostic mode may be useful for such things as checking the compression in the cylinders of the engine 12, as well as checking the engine speed.

As shown in FIG. 2, the Mode Select Process 68 receives a start flag from the Mode Process 62. The Mode Process 62 also puts out a signal indicating the engine diagnostic state to the Controlled Start/Stop Process 64, the Mode Select Process 68, as well as a Battery Control Process 72 and a Driver Information Process 74. In the Battery Control Process 72, reconditioning modes (R-modes) for the battery 46 are inhibited. This helps to ensure that the battery 46 will have enough charge to complete the engine cranking diagnostic testing. In addition, the Mode Process 62 can be configured to cancel the engine cranking diagnostic mode at any time when the SOC of the battery 46 falls below a second predetermined battery charge level. The second predetermined battery charge level, for example, 35%, will typically be below the charge level used to inhibit placing the vehicle 10 in the engine cranking diagnostic mode from the normal mode.

The Driver Information Process 74 can provide some indication—e.g., either audible, visual, or some combination thereof—that the vehicle is in the engine cranking diagnostic mode. As shown in block 74, a flashing red light may be conveniently used as such an indicator. This information is then sent to an instrument cluster (IC) 76.

Figure 3:
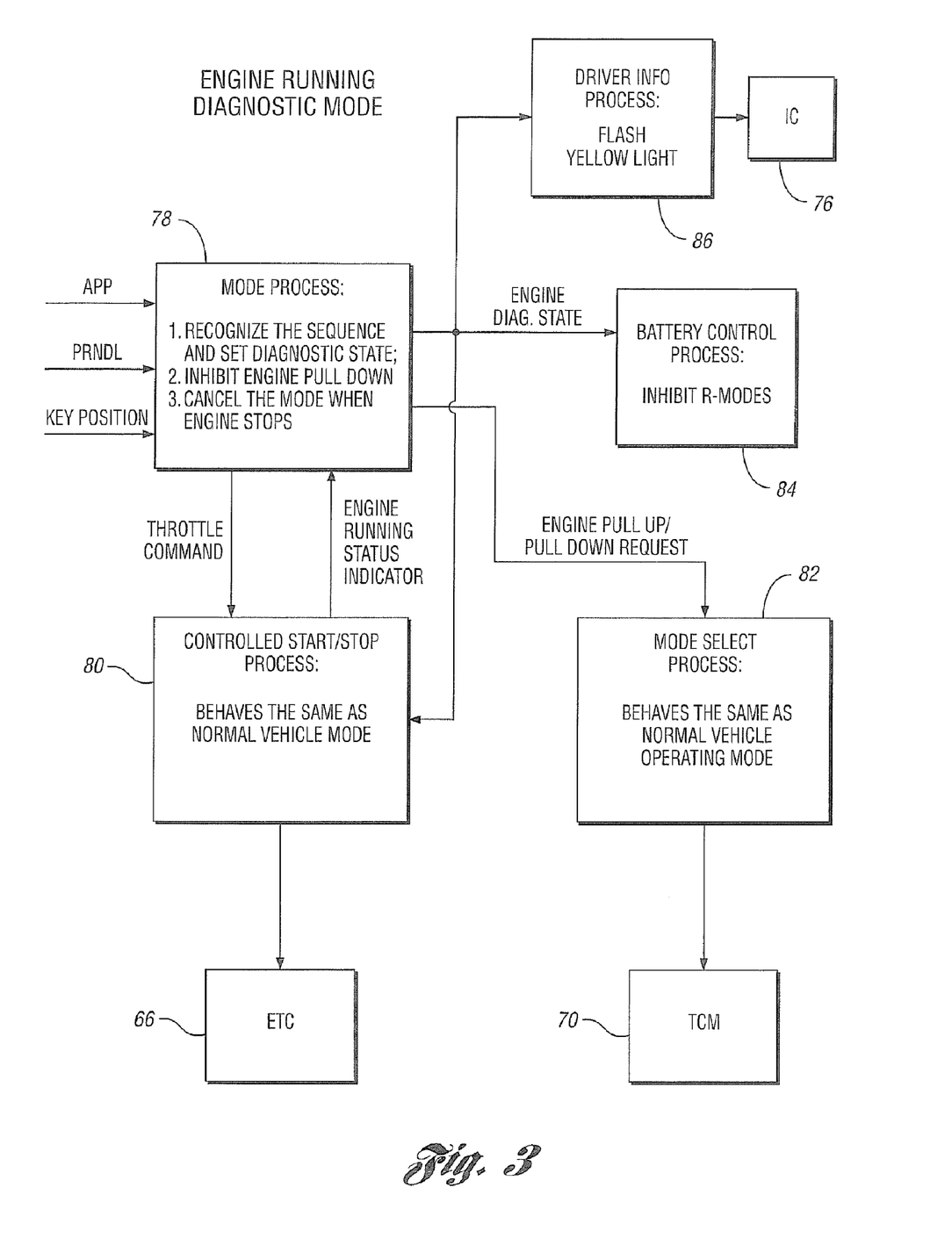
FIG. 3 is a logic diagram illustrating control logic for a second diagnostic mode in accordance with the present invention.

In addition to the engine cranking diagnostic mode, the present invention can also provide a third vehicle operating mode, or second diagnostic operating mode. The control logic for such a mode, in particular an engine running diagnostic mode, is shown in FIG. 3. As with the engine cranking diagnostic mode logic shown in FIG. 2, the engine running diagnostic mode logic can be programmed into the VSC 50. Alternatively, some or all of this logic could be programmed into other vehicle controllers. In the engine running diagnostic mode, operation of the engine 12 is independent of the vehicle power requirements. In particular, the engine 12 is allowed to run continuously, and is not subject to the selective and automatic starting and stopping that is indicative of the normal operating mode.

In the engine running diagnostic mode, a Mode Process 78 receives a number of inputs, including accelerator pedal position, the position of the ignition switch 58, and the position of the transmission gear selector 60. The Mode Process 78 recognizes the sequence of operation and position of the accelerator pedal 56, the ignition switch 58, and the transmission gear selector 60; when the proper sequence is recognized, engine pull-down is inhibited. This means that the engine 12 will not be shut off according to the logic used in the normal operating mode. When the engine 12 stops, the engine running diagnostic mode is automatically canceled.

The Mode Process 78 sends a throttle command to the Controlled Start/Stop Process—see block 80. In turn, the Controlled Start/Stop Process 80 sends an engine running status indicator back to the Mode Process 78. As shown in FIG. 3, the Controlled Start/Stop Process 80 controls the engine 12 exactly the same as if the vehicle 10 were in the normal operating mode and the engine 12 was requested to run based on vehicle power requirements or other considerations. As in the engine cranking diagnostic mode, the Controlled Start/Stop Process 80 communicates with the ETC 66.

As shown in FIG. 3, the Mode Process 78 also communicates with the Mode Select Process—see block 82. In particular, the Mode Process 78 sends an engine pull-up/pull-down request to the Mode Select Process 82. The Mode Select Process 82 behaves the same as it would if the vehicle 10 were in the normal operating mode. That is, if the Mode Process 78 commands the engine 12 to start (pull-up), the Mode Select Process 82 will facilitate engine start. Conversely, if the Mode Process 78 requests an engine pull-down, the Mode Select Process 82 will stop the engine 12. As with the engine cranking diagnostic mode, shown in FIG. 2, the Mode Select Process 82 also communicates with the TCM 70.

In addition to communicating with the Controlled Start/Stop Process 80 and the Mode Select Process 82, the Mode Process 78 also communicates with a Battery Control Process 84 and a Driver Information Process 86. The Battery Control Process 84 receives the engine diagnostic state from the Mode Process 78. When the engine running diagnostic mode has been initiated, the Battery Control Process 84 inhibits R-modes for the battery 46. In order to identify the engine running diagnostic mode separately from the engine cranking diagnostic mode, the Driver Information Process 86 uses a different audible and/or visual indicator to show that the vehicle 10 is in the engine running diagnostic mode. For example, an iconic indicator, such as a wrench or other representation, may be used in conjunction with a light that has a color different from the color used to indicate the engine cranking diagnostic mode. When a visual indicator is used, this information is then displayed on the IC 76.

As noted above, the present invention contemplates the use of vehicle systems, rather than external devices, to change the vehicle operating mode from the normal operating mode to the engine cranking diagnostic mode. A predetermined sequence of operations can be required to effect such a change. This can help to ensure that the vehicle 10 is not inadvertently placed in the engine cranking diagnostic mode. In addition, it may be beneficial to require that at least some of the steps in the predetermined sequence of steps be performed within a predetermined time period, to further ensure that the vehicle 10 is not inadvertently placed in the engine cranking diagnostic mode.

Figure 4:
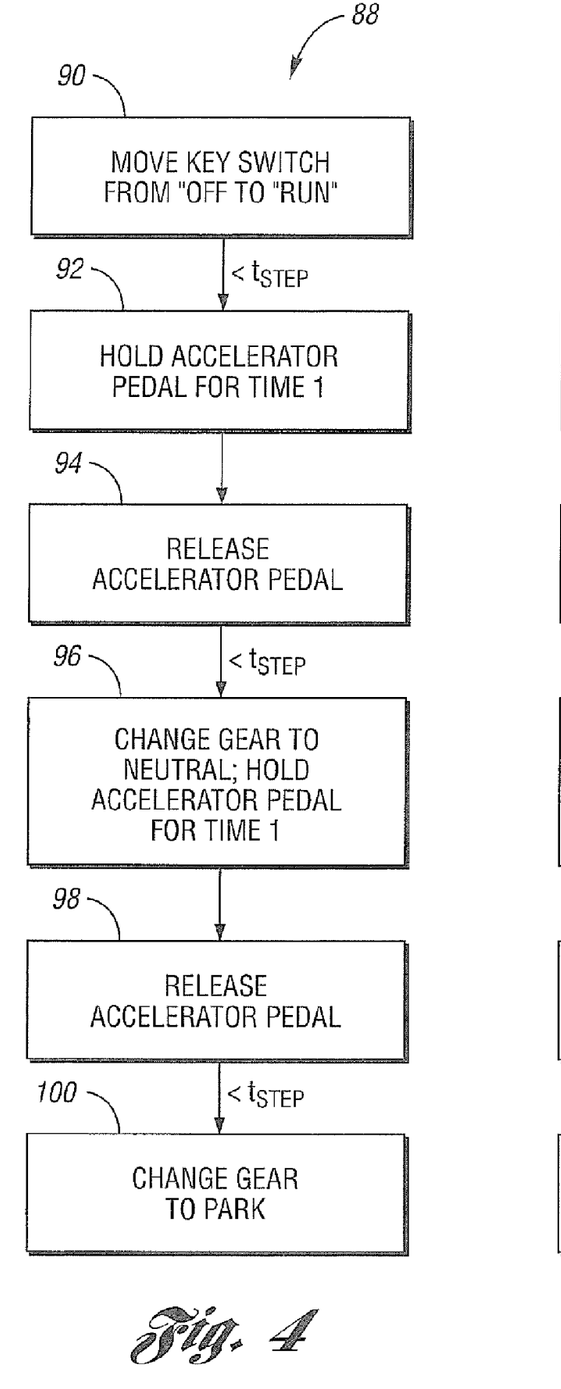
FIG. 4 is a flow chart illustrating a method of changing a vehicle from a normal operating mode to a first diagnostic mode in accordance with the present invention.

FIG. 4 shows a flow chart 88 illustrating a method of changing a vehicle 10 from the normal operating mode to the engine cranking diagnostic mode. It is worth noting that although FIG. 4, and FIG. 5 discussed below, illustrate a particular sequence of operations for changing the vehicle operating mode, the present invention contemplates the use of other methods for changing the vehicle operating mode. In FIG. 4, the first step in changing the vehicle operating mode is shown in block 90, where the ignition switch 58 is moved from the "off" position to the "run" position.

The next step, shown in block 92, must be performed within some predetermined time after the ignition switch 58 is moved to the "run" position. This time is shown in FIG. 4 as "$t_{step}$". The time, $t_{step}$, can be any convenient time period, for example, $0 < t_{step} < 5$ sec. The operation shown in block 92—fully depressing the accelerator pedal 56—must not only be performed within five seconds of step 90, but the accelerator pedal 56 must be held for a period of "Time 1". The time, Time 1, can be set to any convenient time period, such as 5 sec.<Time 1<15 sec.

After the accelerator pedal 56 is held fully open for some time within the time period Time 1, the accelerator pedal 56 is then fully released at step 94. Step 96 must again be performed within five seconds of the previous step. Step 98 involves changing the transmission gear selector 60 from park to neutral. Then, the accelerator pedal 56 is again fully depressed for some time within the time period Time 1. At step 98, the accelerator pedal 56 is released, and within five seconds, the transmission gear selector 60 is changed from neutral to park—see step 100. The vehicle 10 is now in the engine cranking diagnostic mode. As noted above, the vehicle 10 will be placed back in the normal operating mode if the SOC of the battery 46 falls below some predetermined battery charge level. Moreover, the vehicle 10 will return to the normal operating mode if the ignition switch 58 is turned to the "off" position.

Figure 5:
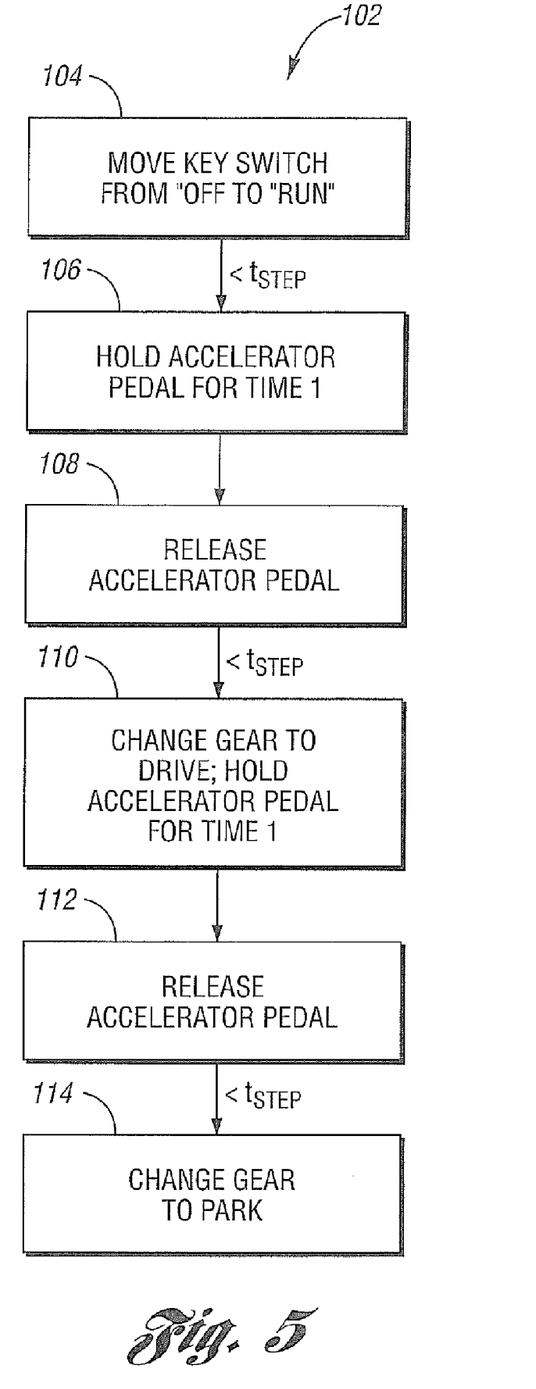
FIG. 5 is a flow chart illustrating a method of changing a vehicle from a normal operating mode to a second diagnostic mode in accordance with the present invention.

FIG. 5 shows a flow chart 102 illustrating a method for changing the vehicle operating mode from the normal operating mode to the engine running diagnostic mode. As will be readily seen, many of the steps are the same as the steps used to change the vehicle operating mode from the normal operating mode to the engine cranking diagnostic mode. In fact, it is the same vehicle systems which are used to effect the change into each of the respective diagnostic modes. As shown in the flow chart 102, however, there is a different predetermined sequence of steps from that which is used in the flow chart 88, shown in FIG. 4.

At step 104, the ignition switch 58 is moved from the "off" position to the "run" position. Within a time period that is less than $t_{step}$, the accelerator pedal 56 is held fully depressed for some time within the time period, Time 1—see step 106. It is worth noting that the time period $t_{step}$ and time 1 are the same for both the engine cranking diagnostic mode and the engine running diagnostic mode. Although these time periods need not be the same for each of the two diagnostic modes, it may be convenient to set them the same, so as to provide consistency between the two diagnostic modes.

At step 108, the accelerator pedal 56 is fully released, and within a time period less than $t_{step}$, the transmission gear selector 60 is changed from park to drive. The accelerator pedal 56 is again held fully depressed for some time within the time period Time 1; this is illustrated at step 110. At step 112, the accelerator pedal 56 is fully released, and within the time period $t_{step}$, the transmission gear selector 60 is changed from drive to park—see step 114. The vehicle 10 is now in the engine running diagnostic mode. When the ignition switch 58 is turned to the "start" position, the engine 12 will be started, and will be operated as if the vehicle 10 were in the normal mode and the engine 12 was requested to run based on vehicle power requirements or other considerations.

Just as with the engine cranking diagnostic mode, should any of the steps required to place the vehicle 10 in the engine running diagnostic mode fail, the vehicle 10 will remain in the normal operating mode. This again helps to ensure that the vehicle 10 will not be inadvertently placed into one of the diagnostic modes. As noted above in a description of the engine running diagnostic mode logic shown in FIG. 3, there is no set throttle command for this operating mode. Thus, the engine can be revved or otherwise operated at different speeds to facilitate the diagnostic testing. While the engine 12 is running, it may continue to charge the battery 46, even if it charges at a low rate. If the battery SOC gets too high while the vehicle 10 is in the engine running diagnostic mode, the engine 12 will be automatically shut off. If the engine 12 stops for any reason when the vehicle 10 is in the engine running diagnostic mode, the vehicle 10 will automatically be placed back into the normal operating mode.

While the best mode for carrying out the invention has been described in detail, those familiar with the art to which this invention relates will recognize various alternative designs and embodiments for practicing the invention as defined by the following claims.

What is claimed is:
1. A vehicle, comprising:
   an engine;
   an electric machine operable to provide torque to drive the vehicle;
   a battery in communication with the electric machine for selectively providing energy to, and receiving energy from, the electric machine; and
   a control system including at least one controller, the control system being configured to selectively and automatically start and stop the engine when the vehicle is in a first operating mode, the control system further including control logic executable to place the vehicle in a second operating mode wherein the engine can be cranked but not started, the execution of the control logic to place the vehicle in the second operating mode being effected by operation of at least one vehicle system, the control system being further configured to prohibit placement of the vehicle in the second operating mode when a state of charge of the battery is less than a first predetermined battery charge level.

2. The vehicle of claim 1, further comprising:
an accelerator pedal;
a transmission gear selector; and
a switch including at least two positions related to operation of the vehicle, and
the at least one vehicle system includes at least one of the accelerator pedal, the transmission gear selector, and the switch.

3. The vehicle of claim 2, wherein execution of the control logic to place the vehicle in the second operating mode is effected by operation of at least two of the accelerator pedal, the transmission gear selector, and the switch in a predetermined sequence of steps.

4. The vehicle of claim 3, wherein the control system is further configured such that at least some of the steps in the predetermined sequence of steps are required to be completed within a respective predetermined time period in order to place the vehicle in the second operating mode.

5. The vehicle of claim 1, wherein the control system is further configured to stop the operation of the engine when the vehicle is in the second operating mode and the state of charge of the battery is less than a second predetermined battery charge level, lower than the first predetermined battery charge level.

6. The vehicle of claim 1, wherein the control system is further configured to selectively and automatically stop the engine, when the vehicle is in the first operating mode, based at least in part on vehicle power requirements, and
wherein the control system further includes control logic executable to place the vehicle in a third operating mode wherein operation of the engine is independent of the vehicle power requirements.

7. The vehicle of claim 6, wherein the control system is further configured to stop the operation of the engine when the vehicle is in the third operating mode and a state of charge of the battery is greater than a third predetermined battery charge level.

8. A vehicle, comprising:
an engine;
an electric machine operable to provide torque to drive the vehicle;
a battery in communication with the electric machine for selectively providing energy to, and receiving energy from, the electric machine;
a control system including at least one controller, the control system being configured to effect at least two vehicle operating modes, including a normal operating mode and a first diagnostic operating mode, the normal operating mode including selective and automatic starting and stopping of the engine based at least in part on vehicle power requirements, the first diagnostic operating mode being effective to facilitate cranking of the engine and prohibit starting of the engine, the control system being further configured to prohibit placement of the vehicle in the first diagnostic operating mode when a state of charge of the battery is less than a first predetermined battery charge level; and
at least one vehicle system operable in a predetermined manner to change the vehicle operating mode from the normal operating mode to the first diagnostic operating mode.

9. The vehicle of claim 8, further comprising:
an accelerator pedal;
a transmission gear selector; and
a switch including at least two positions related to operation of the vehicle, and
wherein the vehicle operating mode is changed from the normal operating mode to the first diagnostic operating mode by operation of at least two of the accelerator pedal, the transmission gear selector, and the switch in a predetermined sequence of steps, and
wherein at least some of the steps in the predetermined sequence of steps are required to be completed within a respective predetermined time period in order to change the vehicle operating mode from the normal operating mode to the first diagnostic operating mode.

10. The vehicle of claim 8, wherein the control system is further configured to stop the operation of the engine when the vehicle is in the first diagnostic operating mode and the state of charge of the battery is less than a second predetermined battery charge level, lower than the first predetermined battery charge level.

11. The vehicle of claim 8, wherein the control system is further configured to effect a second diagnostic operating mode, including operation of the engine independent of vehicle power requirements.

12. The vehicle of claim 11, wherein the control system is further configured to prohibit operation of the engine when the vehicle is in the second diagnostic operating mode and a state of charge of the battery is greater than a third predetermined battery charge level.

13. A method for controlling an engine in a vehicle having an electric machine operable to provide torque to drive the vehicle, the vehicle including a first operating mode wherein the engine is selectively and automatically started and stopped based at least in part on vehicle power requirements, the method comprising:
operating at least one vehicle system in a first predetermined manner to change the vehicle operating mode from the first operating mode to a second operating mode, thereby changing the vehicle operating mode without employing the use of a device external to the vehicle, the second operating mode facilitating cranking of the engine and prohibiting starting of the engine.

14. The method of claim 13, providing at least one of a visual indicator and an audible indicator when the vehicle is in the second operating mode.

15. The method of claim 13, the vehicle further including an accelerator pedal, a transmission gear selector, and a switch including at least two positions related to operation of the vehicle, wherein the operating of at least one vehicle system in a first predetermined manner to change the vehicle operating mode from the first operating mode to the second operating mode includes operating at least two of the accelerator pedal, the transmission gear selector, and the switch in a first predetermined sequence of steps.

16. The method of claim 15, further comprising:
allowing the vehicle operating mode to be changed from the first operating mode to the second operating mode when at least some of the steps in the first predetermined sequence of steps are performed within a respective time period; and prohibiting changing the vehicle operating mode from the first operating mode to the second operating mode when the at least some of the steps are not performed with the respective time period.

17. The method of claim 13, further comprising:
operating at least one vehicle system in a second predetermined manner to change the vehicle operating mode from the first operating mode to a third operating mode, thereby changing the vehicle operating mode without employing the use of a device external to the vehicle, the third operating mode facilitating operation of the engine independent of vehicle power requirements.

18. The method of claim 17, wherein the operating of at least one vehicle system in a second predetermined manner to change the vehicle operating mode from the first operating mode to the third operating mode includes operating at least two of the accelerator pedal, the transmission gear selector, and the switch in a second predetermined sequence of steps.

19. The method of claim 15, wherein the switch includes an ignition switch.

* * * * *